United States Patent
Link et al.

(10) Patent No.: US 6,674,926 B1
(45) Date of Patent: Jan. 6, 2004

(54) CONTROLLER FOR A MULTIPLE ARRAY COLOR SENSOR

(75) Inventors: Bruce A. Link, Rochester, NY (US); Mark A. Barton, Rochester, NY (US); Daniel Oldfather, Rochester, NY (US); Joseph T. Olesik, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/289,351

(22) Filed: Apr. 9, 1999

(51) Int. Cl.[7] .............. H04N 1/04; G06K 7/00
(52) U.S. Cl. ............. 382/312; 358/474; 358/482; 358/483
(58) Field of Search ............. 358/500, 501, 358/504, 512, 513, 520; 382/167, 312

(56) References Cited

U.S. PATENT DOCUMENTS

| | | | |
|---|---|---|---|
| 4,107,732 A | 8/1978 | Adcock et al. | 358/43 |
| 4,656,503 A | 4/1987 | Hynecek | 358/44 |
| 4,672,433 A * | 6/1987 | Yamamoto | 358/80 |
| 4,725,880 A | 2/1988 | Dischert | 358/43 |
| 4,857,996 A | 8/1989 | Hirano et al. | 358/48 |
| 5,043,819 A | 8/1991 | Cheon et al. | 358/213.23 |
| 5,168,350 A | 12/1992 | Shinozaki et al. | 358/43 |
| 5,438,364 A | 8/1995 | Maeshima et al. | 348/223 |
| 5,648,667 A | 7/1997 | Konuma | 257/233 |
| 5,675,425 A | 10/1997 | Imoto et al. | 358/513 |
| 5,917,621 A * | 6/1999 | Yushiya | 358/518 |
| 2002/0048055 A1 * | 4/2002 | Yushiya | 358/518 |

FOREIGN PATENT DOCUMENTS

EP    0332103 A2 * 9/1989    ......... H04N/1/46

* cited by examiner

*Primary Examiner*—Jerome Grant, II
(74) *Attorney, Agent, or Firm*—Nelson Adrian Blish

(57) ABSTRACT

A color image reading device, an output controller and a method of controlling an output from a color image reading device provide for an improved signal-noise ratio for the scanning of two-dimensional objects, as in document scanners. In the present invention, the position of a color image reading device with respect to an object to be read is oriented in order to optimize illumination in, for example, the blue wavelength. Pixel data for each line is read, generated in reverse order and/or re-phased so as to compensate for offset linear sensors on the color image reading device.

9 Claims, 4 Drawing Sheets

CONTROLLER FOR A MULTIPLE ARRAY COLOR SENSOR

FIELD OF THE INVENTION

The present invention relates to a color image reading device, an output controller for an image capture system, and a method of controlling an output from a color image reading device. More specifically, the invention relates to the optimization of the positioning of multiple-array linear charge-coupled devices (CCD) to provide improved signal to noise ratio for the scanning of two-dimensional objects, as in document scanners.

BACKGROUND OF THE INVENTION

A color image reading device such as a linear color charge-coupled device (CCD) may be comprised of an array of linear sensors. Each of the linear sensors are optimized to receive a different portion of a spectral emission from an object imaged on the device. In conventional color CCD devices, each of the linear sensors may include a different color filter and each sensor is separated from an adjacent sensor by a distance of N lines. This results in each array capturing a different line of the document during one raster scan. In conventional arrangements, one of the linear sensors of the array of sensors may be less sensitive to spectral emission. As an example, the signal-to-noise ratio (S/N) for the blue channel or filter in CCD devices may be lower than desired due to the lower sensitivity of the CCD to blue light, and/or lower object illumination levels in the blue portion of the spectrum. Also, because of the CCD line offset as noted above, a single raster from the CCD will contain information from three separate lines. To properly register and display an image, the data of the image must be re-phased to place data from a single line of the image into the same raster of image data.

SUMMARY OF THE INVENTION

The present invention provides for an arrangement which overcomes the drawbacks noted above. A first feature of the present invention relates to the reversal of the orientation of the color image reading device relative to an object to be imaged upon it, in order to optimize illumination in blue wavelengths. Because the individual line sensors of the color image reading device are physically offset from one another, that offset results in each sensor capturing a different segment of the object during each raster. When it is desirable to reverse the orientation of the color image reading device relative to the object to be scanned in order to optimize illumination and signal-to-noise ratio, pixel data for each line is then generated in reverse order. In a further feature of the present invention, the altered data from the offset linear sensors are phased based on the reversed orientation noted above.

The present invention provides for a method and means by which to compensate order and phasing of the output from a color image reading device, such as a color image scanning system, that arises from the relative orientation of multiple linear sensor arrays, which involves orienting the color image reading device relative to an object to be scanned by means of a line controller.

The present invention relates to a color image reading device which comprises an array of linear sensors, with each of the linear sensors receiving a different portion of a spectral emission from an object to be imaged. One of the linear sensors of the array of linear sensors being least sensitive to spectral emission and being positioned closest to an illumination source for the object.

The present invention further relates to a color image reading device which comprises an array of linear sensors, with each of the linear sensors receiving a different portion of a spectral emission from an object to be imaged. One of the linear sensors of the array of linear sensors receiving a portion of a spectral emission that is weakest and being positioned closest to an illumination source for the object.

The present invention further relates to an output controller for an image capture system which comprises a color image reading device having an array of linear sensors that receive a different portion of a spectral emission from an object to be. An orientation of the linear sensors resulting in a reversal of pixel data within a raster. The controller of the present invention further comprises a line controller that receives the pixel data from the color image reading device and reverses the pixel data.

The present invention further relates to an output controller for an image capture system which comprises a color image reading device having an array of linear sensors which receive a different portion of a spectral emission from an object to be imaged and provides an image signal indicative thereof. The image signal comprises a raster of pixel data from different points on the object. The controller further comprises a line controller which receives the image signal from the color image reading device and re-phases color pixel values of the raster of pixel data to refer to the same point on the object.

The present invention further relates to a method of controlling an output from a color image reading device which comprises the steps of passing an object to be read relative to a color image reading device having an array of linear sensors, so as to provide for a raster of pixel data representative of different points on the object; and providing the raster of pixel data to a line controller which reverses the raster of pixel data.

The present invention further relates to a method of controlling an output from a color image reading device which comprises the steps of passing an object to be read relative to a color image reading device having an array of linear sensors, so as to provide for a raster of pixel data representative of different points on the object; and providing the raster of pixel data to a line controller which re-phases color pixel values of the raster of pixel data to refer to the same point on the object.

DETAILED DESCRIPTION OF THE INVENTION

Figure 1:
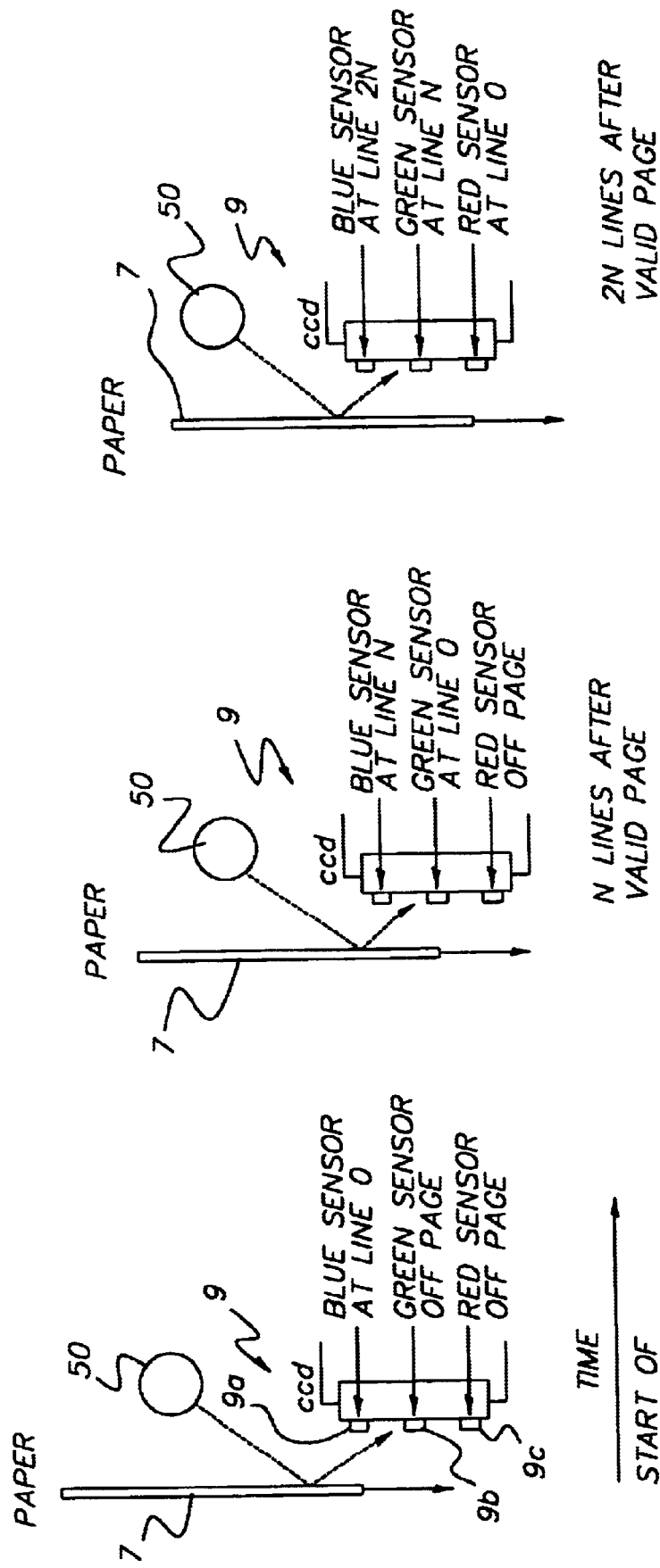
FIGS. 1a–1c illustrate the scanning of an object via a color image reading device such as a CCD.

Referring now to the drawings, wherein like reference numerals represent identical or corresponding parts throughout the several views, FIGS. 1a–1c illustrate a scanning and orientation of an object 7 to be scanned or read with respect to a color image reading device 9 in accordance with the present invention. As shown in FIGS. 1a–1c, object 7 is a sheet of paper, while color image reading device 9 is a CCD (charge-coupled device). As shown in FIG. 1a, CCD 9 of the present invention includes, in sequential order, a blue sensor 9a, a green sensor 9b and a red sensor 9c. As further shown in FIGS. 1a–1c, time is illustrated on the X-axis of the page and is measured relative to the start of a valid page reading. In accordance with the present invention, the orientation of the sensors are set so that blue sensor 9a of CCD 9 is closest to an illumination source 50, such as a lamp, and sees object 7 first and, therefore, in FIG. 1a blue sensor 9a is at line 0, green sensor 9b is off the page, and red sensor 9c is off the page.

FIG. 1b represents N lines after a valid page reading. As shown in FIG. 1b, blue sensor 9a is at line N, green sensor 9b is at line 0 and red sensor 9c is off the page.

FIG. 1c represents 2N lines after a valid page. As illustrated in FIG. 1c, blue sensor 9a is at line 2N, green sensor 9b is at line N and red sensor 9c is at line 0. Therefore, red sensor 9c sees the document last.

Figure 2:
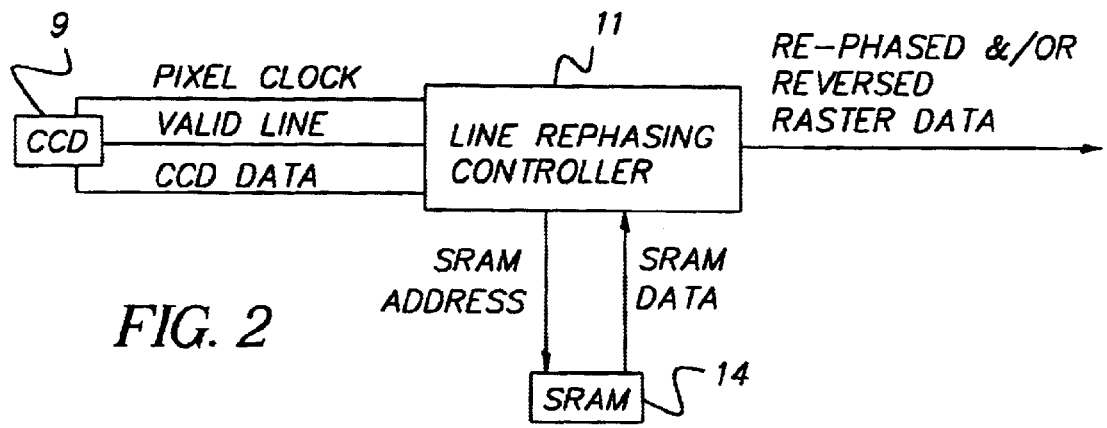
FIG. 2 illustrates an image capture system including a line controller, an image reading device such as a CCD, and a memory device such as a SRAM.

FIG. 2 illustrates an image capture system which includes a line controller 11 and a memory (SRAM) (static random access memory) 14 associated with CCD 9. In the arrangement of the present invention, line controller 11 accepts a raster of pixel data (RGB) (red, green, blue) that was composed of three different points on object 7 from CCD 9, and produces a raster of pixel data (RGB) with the color values re-phased and/or reversed to refer to the same point on a document.

As shown in FIG. 2, line controller 11 receives 3 color data values from CCD 9, a valid line signal to confirm valid data from CCD 9, a pixel clock to signal a valid pixel, and data from SRAM 14 which temporarily stores data.

SRAM 14 is organized as rows of raster data. Each row contains a raster of color pixels (RGB). The number of rows required, N+2, is determined by the number of rasters N between the furthest two color sensors on CCD 9.

In a preferred embodiment of the present invention, the furthest two color sensors are 16 rasters apart. Therefore, 17 rows are required to store the rasters plus an extra row for the incoming raster. To permit access to the temporarily stored data, the address of SRAM 14 is partitioned as follows:

SRAM address=<ROW Address><Pixel Number>where:
Row Address represents a raster stored; and
Pixel Number represents a specific RGB pixel value in the raster.

Figure 3:
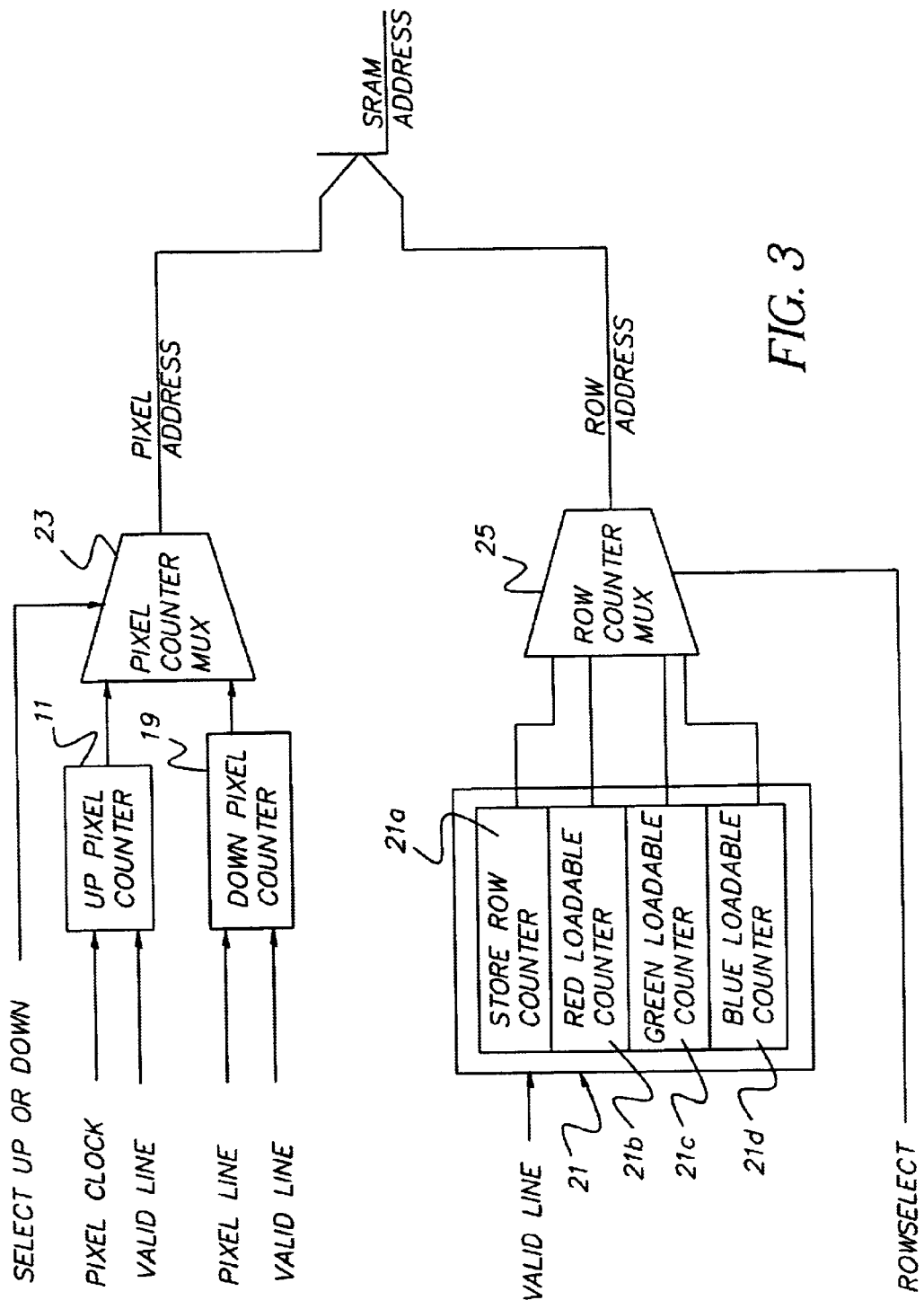
FIG. 3 illustrates a schematic illustration of the elements of the line controller.

FIG. 3 shows a schematic view of the specifics of line controller 11. In the present invention, counters 17, 19, 21 as shown in FIG. 3 are used to generate the row address and pixel number. Counter 17 is an up-pixel counter, counter 19 is a down pixel counter and counter 21 is a row counter. Row counter 21 includes a store row counter 21a, a red loadable counter 21b, a green loadable counter 21c and a blue loadable counter 21d. At the end of a valid line, row counter 21 is incremented, pixel counter 17 is reset to 0 and pixel counter 19 is set to the maximum number of pixels per raster. Line controller 11 stores incoming pixel data in the current row specified by row counter 21. Pixel counter 17 increments for each RGB pixel value. Line controller 11 thereafter performs re-phasing on a previous row so three counters are required to specify the source of the data value for the re-phased color channel. Counter 21 is loadable to allow the controller to handle any CCD re-phasing offset. Since line controller 11 performs re-phasing on a current pixel number before the next pixel value, line controller 11 must be clocked at a higher rate than a CCD pixel clock which runs the image reading device.

Figure 4:
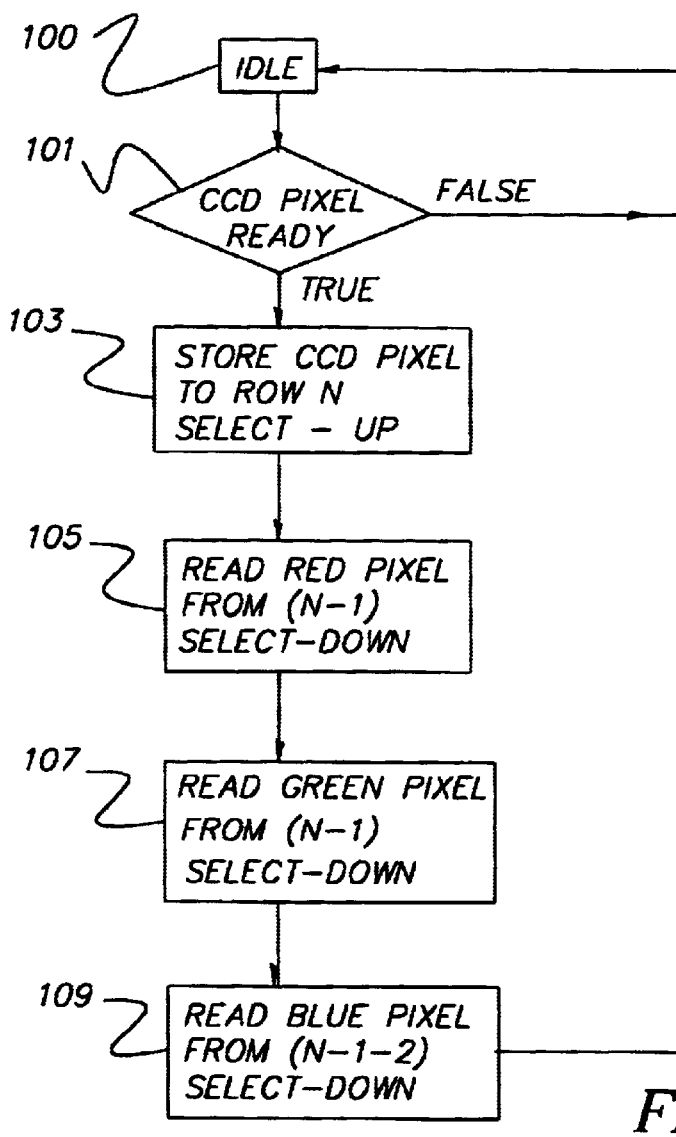
FIG. 4 illustrates a state machine illustration of the selection process with respect to the line controller of FIG. 3.

As further shown in FIG. 3, a pixel counter Mux 23 receives a select signal with respect to counter 17 or counter 19 to provide for a pixel address to SRAM 14. The specifics of the selection signal is illustrated as a state machine in FIG. 4. As shown in FIG. 4, during selection, after idle 100 and CCD pixel ready status 101, a CCD pixel is stored in row N (103) and up pixel counter 17 is selected. As also shown, a reading of a red pixel from row N-1 (105) selects down pixel counter 19, a reading of a green pixel from row N-1-phase offset (107) selects down pixel counter 19, and a reading of a blue pixel from row N-1-2*(phase-phase offset) (109) selects down pixel counter 19. The system repeats for the next CCD pixel.

As further shown in FIG. 3, a Row Select Mux 25 receives a select signal with respect to row counters (21a, 21b, 21c and 21d) to provide for a row address to SRAM 14. The specifics of the selection signal is illustrated as a state machine in FIG. 4. As shown in FIG. 4, during selection, after idle 100 and CCD pixel ready status 101, a CCD pixel is stored in row N (103) and store row counter 21a is selected. As also shown, a reading of a red pixel from row N-1 (105) selects red loadable counter 21b, a reading of a green pixel from row N-1-phase offset (107) selects green loadable counter 21c, and a reaidng of a blue pixel from row N-1-2*(phase-phase offset) (109) selects down blue loadable counter 21d. The system repeats for the next CCD pixel.

Figure 5:
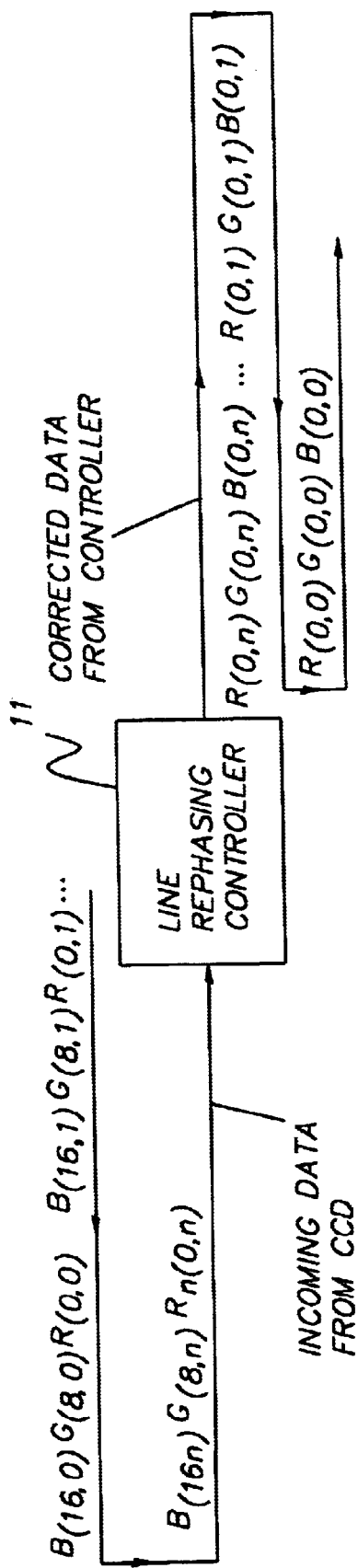
FIG. 5 illustrates a raster stream transformation with respect to the line controller of the present invention.

FIG. 5 illustrates a raster stream transformation. As shown in FIG. 5, incoming data from CCD 9 is reversed and/or re-phased by line controller 11. For example, data from CCD 9 can enter line controller 11 (Row) (Pixel) as $R_{0,0}$ $G_{8,0}$ $B_{16,0}$ and exit line controller 11 as $R_{0,0}$ $G_{0,0}$ $B_{0,0}$. In a preferred embodiment of the present invention, red sensor 9a of the CCD 9 sees the object 7 last, so that reversing and/or re-phasing is referenced to red sensor 9a. Red (loadable) counter 21b stores the row number for the previously captured rasters. Green (loadable) counter 21c stores the number of rasters between the green and red sensors. Blue (loadable) counter 21d likewise stores the number of rasters between the blue and red sensors. To provide line reversal, another pixel counter 19 (FIG. 3) is used. Counter 19 starts at the maximum number of pixels per raster and counts down. When writing to SRAM 14, counter 17 which is an up-pixel counter is used. When reading from SRAM 14, counter 19 which is a down-pixel counter is used. Row counter 21 rolls over when it reaches the maximum number of rows specified. In the present invention, compensation for the reversal is accomplished utilizing the same hardware that is used for line rephasing.

Therefore, the present invention provides for an arrangement that optimizes a positioning of multiple-array linear color CCD devices so as to improve the signal-to-noise ratio for the scanning of two-dimensional objects as in document scanners.

The invention has been described in detail with particular reference to certain preferred embodiments thereof, but it will be understood that variations and modifications can be effected within the spirit and scope of the invention.

What is claimed is:

1. An output controller for an image capture system comprising:

a color image reading device having an array of linear sensors, wherein each of said linear sensors comprises a sub-array of image sensors arranged in a line, wherein each of said linear sensors receives a different portion of a spectral emission from an object to be imaged, wherein an orientation of said linear sensors results in a reversal of pixel data within a raster;

a line controller which receives said pixel data from said color image reading device and reverses said pixel data;

wherein said line controller further re-phases said pixel data to refer to a point on said object; and wherein each of said linear sensors are separated by N lines, such that said line rephasing resynchronizes image data from said linear sensors.

2. An output controller according to claim 1, wherein one of said linear sensors of said color image reading device is less sensitive to spectral emission and is positioned closest to an illumination source of said object.

3. An output controller according to claim 1, further comprising:

a memory device for temporarily storing said raster of pixel data as rows of data.

4. A controller according to claim 1, wherein said one of said linear sensors is a first color sensor, and the others of said linear sensors are color sensors which are different than said first color sensor.

5. A method of controlling an output from a color image reading device, the method comprising the steps of:

passing an object to be read relative to a color image reading device having an array of linear sensors, wherein each of said linear sensors comprises a sub-array of image sensors arranged in a line, so as to provide for a raster of pixel data representative of different points on the object;

providing said raster of pixel data to a line controller which reverses said raster of pixel data;

temporarily storing and organizing said raster of pixel data as rows of raster data represented by a row address and a pixel address, such that the row address represents a stored raster and the pixel address represents a specific color pixel location within a raster;

generating the row address by use of a row counter;

generating a pixel address by use of a pixel counter;

incrementing the row counter at the end of a valid line; and resetting the pixel counter at the end of the valid line.

6. A method according to claim 5, comprising the further step of:

orienting said color image reading device such that one of said linear sensors which is least sensitive to spectral emission from said object is positioned closest to an illumination source for said object.

7. A method according to claim 5, wherein the line controller stores incoming pixel data in a row specified by the row counter and the pixel counter increments for each pixel.

8. A method of controlling an output from a color image reading device, the method comprising the steps of:

passing an object to be read relative to a color image reading device having an array of linear sensors, wherein each of said linear sensors comprises a sub-array of image sensors arranged in a line, as to provide for a raster of pixel data representative of different points on the object;

providing said raster of pixel data to a line controller which re-phases color pixel values of said raster of pixel data to refer to the same point on the object;

temporarily storing and organizing said raster of pixel data as rows of raster data represented by a row address and a pixel address, such that the row address represents a stored raster and the pixel address represents a specific color pixel location within the raster;

generating the row address by use of a row counter;

generating a pixel address by use of a pixel counter;

incrementing the row counter at the end of a valid line;

and resetting the pixel address at the end of the valid line.

9. A method according to claim 8, wherein the line controller stores incoming pixel data in a row specified by the row counter and the pixel counter increments for each pixel.

* * * * *